A. H. LYMN AND N. E. RAMBUSH.
RECOVERY OF AMMONIA FROM PRODUCER GAS.
APPLICATION FILED JULY 23, 1918.

1,309,143.

Patented July 8, 1919.
2 SHEETS—SHEET 2.

Inventors:
Arthur H. Lymn
Niels E. Rambush.

UNITED STATES PATENT OFFICE.

ARTHUR HENRY LYMN AND NIELS EDWARD RAMBUSH, OF LONDON, ENGLAND.

RECOVERY OF AMMONIA FROM PRODUCER-GAS.

1,309,143.  Specification of Letters Patent.  Patented July 8, 1919.

Application filed July 23, 1918. Serial No. 246,393.

*To all whom it may concern:*

Be it known that we, ARTHUR HENRY LYMN, a subject of the King of Great Britain, and NIELS EDWARD RAMBUSH, a subject of the King of Denmark, both residing at 40 Westminster Palace Gardens, Victoria street, London, S. W., England, have invented certain new and useful Improvements in the Recovery of Ammonia from Producer-Gas, of which the following is a specification.

The present invention relates to improvements in the recovery of ammonia from producer gas.

In the manufacture of producer gas with ammonia recovery as done hitherto, in order to prevent the destruction of ammonia, it is necessary to introduce a relatively large amount of steam with the blast, which amounts in practical working to about 2½ tons of steam per ton of fuel gasified.

Only about 25% of the steam takes part in the chemical reactions inside the producer; the remaining 75% leaves the producer undecomposed with the producer gas, tar and ammonia. In consequence of this great excess of steam, the ammonia, in the gas leaving the producer, is only 0.2 to 0.7% of the amount of steam present. The economical recovery of ammonia is therefore very irksome.

If, as has been suggested, the gases leaving the producer were cooled to normal temperature so as to condense the steam and absorb the ammonia in a similar way to that carried on in the manufacture of illuminating gas or coke oven gas, an extremely dilute condensate (in reference to ammonia) would be obtained. For the purpose of obtaining a strong ammonia liquor solution from producer or other gas it has been proposed to lead the gas from the producer or retorts into water-cooled condensers, kept at between 38 to 71° C. to extract the tar, and to lead the resulting gas through a tar extractor from which tar and water of condensation flow back to the condenser; and then to treat the gas from the tar extractor by the water of condensation, to extract ammonia. It is however uneconomical to absorb the ammonia by means of condensed steam, owing to the fact that the partial pressure of the ammonia in the cooled gas is very small, i. e. it varies generally between 1.5 and 5 mm. mercury (N. T. P.) and consequently a large portion of the ammonia will remain unabsorbed by the condensed steam and would therefore escape.

The usual practice is therefore to neutralize the ammonia without condensation of the steam i. e. to neutralize at a temperature above the dewpoint of the gas. For this purpose the hot products from the producer are merely passed through a dust washer, in which they are cooled down to a temperature not materially lower than about 80° C. The still unclean gas is then passed through an ammonia absorbing apparatus where it comes into intimate contact with dilute acid. Thus practically all the ammonia is removed from the gas before the latter is cleaned. Although by this means the condensation of the steam is avoided and a reasonably concentrated solution of ammonia salt thus obtained, the latter is contaminated with tar. Moreover only such acids can be used for neutralizing the ammonia as are stable at the process temperature.

With the object of avoiding these difficulties it has been proposed to first separate the tar at above 100° C. by passing the gas through a spray of tar which has been separated from said gases and afterward to separate water from said gases by passing them through a spray of water condensed from the gases, the ammonia being thereafter recovered from the gases by neutralization. In that process however the amount of condensed water would not be sufficient to condense all the moisture unless outside cooling means were used. Moreover a number of operations and apparatus are required.

It has also been proposed in connection with ammonia recovery gas plants having for their object the direct production of sulfate of ammonia in circulated ammoniacal liquor, to pass the hot gases in intimate contact with cool water moving in the opposite direction in a closed receptacle, thus cooling the gases to temperatures from 30° C. to 70° C., previous to the entrance of said gases into an acid tower or ammonia absorbing chamber. Although it is claimed that by this process the quantity of ammonia present with the cool gases leaving was practically the same as was present with the entering hot gases and that no appreciable quantity of ammonia was lost, it has been found in the practical working of this process that owing to the intimate contact of the ammonia containing gases with a large volume of water, it is impossible to prevent the water from retaining a considerable amount of ammonia, on account of the solubility of ammonia in water. At ordinary temperature 1050 parts of ammonia are soluble in 100 parts of water and even at 100° C. 97 volumes of ammonia remain dissolved in 100 parts of water. The ammonia, which is therefore necessarily retained in the cooling water, would be lost for recovery.

The present invention aims at overcoming the aforementioned drawbacks and provides an economical ammonia recovery producer gas process and apparatus whereby a clean ammonium salt may be produced and an economical process carried out even when using such acids as are unstable at the temperatures of the usual process.

According to this invention the steam and tar are simultaneously condensed and separated from the gas in one operation while the ammonia remains in the gas so that practically all the ammonia leaving the gas producer will be contained in the cleaned gas which is then absorbed by washing it with an acid in the cold.

For this purpose the gas is passed through condensing means acting on a principle similar to reflux condensers. Said condensing means are kept near the zone where the gas enters at a temperature just at or above the dew point i. e. not materially below 80° C. (if necessary by additional means) so that ammonia which may have been absorbed by the condensate is continuously volatilized, whereas near the zone where the gas leaves, the temperature is kept at such a degree not materially above 40° C. that the steam and tar are condensed while the ammonia passes away with the gases.

Additional means may be provided for volatilizing any small amount of ammonia that may not have been completely volatilized from the condensate prior to its flowing from the reflux condenser, such as for instance heating the condensate with or without the addition of lime or other alkali.

Means are also provided to utilize the heat of the gases which is communicated to the cooling water, for pre-heating the air of the producer blast.

In the following one way of carrying out the invention is given by way of example:

The hot products leaving the producer are passed in a known manner through a gas washer wherein the dust contained in the gases is removed in a wet state and in which the gases are cooled down to a temperature not materially lower than about 80° C. In order to recover any fixed ammonia, (ammonium sulfate, ammonium chlorid, etc.,) which may be dissolved in the washing liquid some lime may be introduced into the washer in a known manner. Instead of passing the gases to the ammonia absorber as is usually done, according to the present invention the gases are passed upward through a tubular or other suitable condenser, or through a plurality of such condensers arranged in series or in parallel, acting on a principle similar to reflux condensers wherein the steam and tar are condensed from the gas practically without absorption of ammonia. These condensers are however worked differently from the way in which condensers are usually worked in so far as we keep the condenser near the zone where the gas enters at a temperature which is just at or above the dew point i. e. not materially below 80° C. (if necessary by outside means) so that ammonia which may have been absorbed by the condensate is continuously volatilized, whereas near the zone of said condenser where the gas leaves, the temperature is kept at such a degree not materially above 40° C. that the steam and tar are condensed, while the ammonia passes away with the gases. The tar and practically all the moisture are thus removed from the gas simultaneously and in one operation except that amount of moisture which corresponds to the dew point of the cooled gas leaving the condensers, i. e. the amount of moisture necessary to saturate the gas at the temperature at which it leaves the condenser.

By this means the steam contained in the gas entering for example at the lowest part of a vertical condenser on rising condenses and naturally more and more ammonia will be absorbed as the gases ascend. This condensate falling down the condenser together with the condensed tar comes into contact with the hotter regions below and thus again gives off the absorbed ammonia, while the condensed steam itself will not be materially vaporized owing to the fact that the gas is maintained at its dewpoint. Any ammonia remaining in the hot condensate may be driven off by any suitable means and returned to the gas entering the condenser. Part of the condensate leaving the condensers may be used as make up water in the dust washer.

As apparatus for carrying out this process a number of superimposed tubular condensers may be used. Between the tube plate of each two tubular condensers a free space may be provided for mixing the gases and vapors passing through the tubes. The gas passes upward through the tubes whereas the space outside the tubes is fed with cooling water.

In order to recover the heat communicated by the gas to the cooling water and to saturate the air, the air blast on its way to the producer may be passed through the spaces between the tubes i. e. around the tubes through which the gas passes. The cooling water being supplied in the form of liquid films surrounding said tubes inside which the gas passes, the air blast on its way to the producer thus comes into intimate contact with the water films resulting in an efficient heat interchange, and saturation of the blast.

In order to understand the invention more clearly, reference is made to the accompanying drawings, which show by way of example, one way of carrying out the invention.

Figure 1:
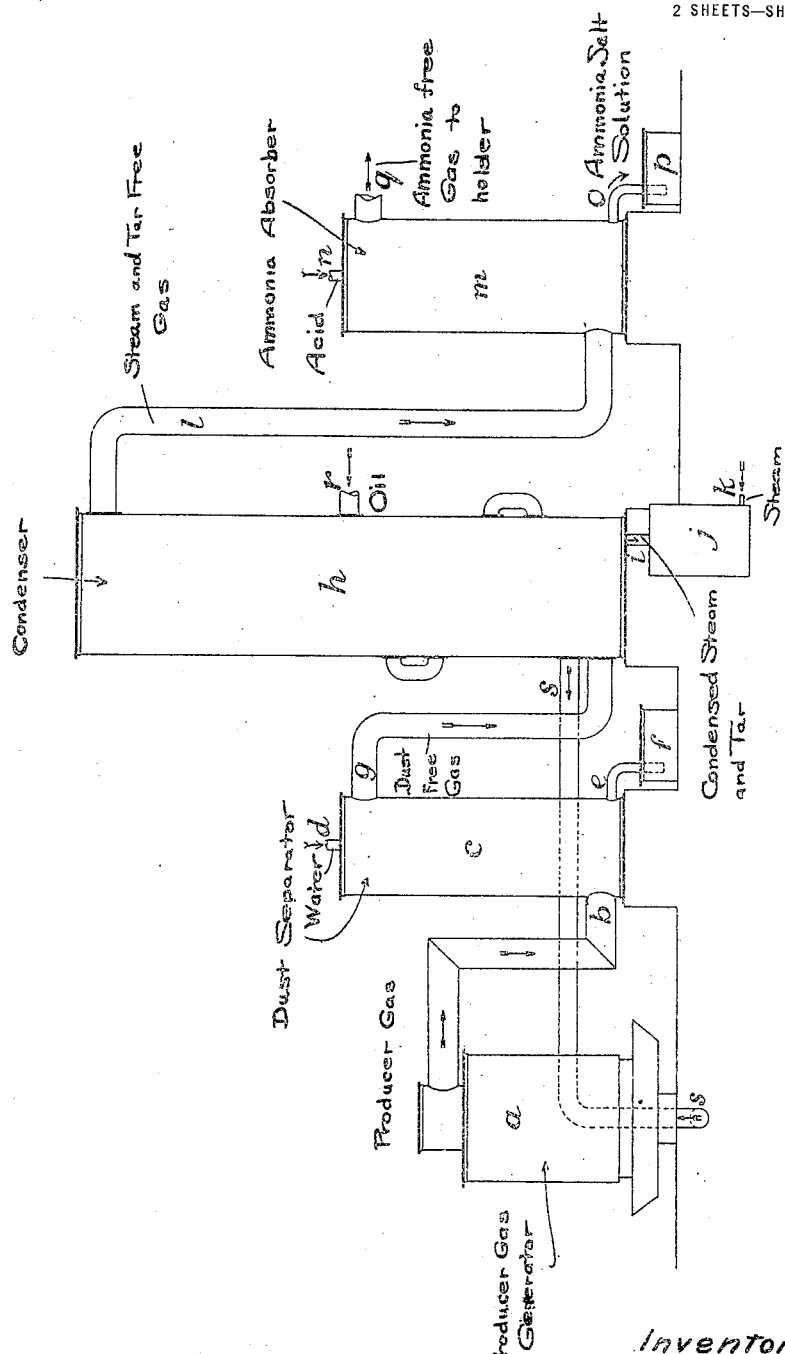
Figure 1 shows in elevation a general arrangement of a producer gas plant in which the process of the present invention is used.

Referring to Fig. 1, $a$ indicates the producer or gas generator.

The gas generated is conducted through the conduit $b$ to a dust-separator $c$. Water is circulated through this dust-separator through the inlet $d$ and issues from the outlet $e$ into a tank $f$. The gases freed from dust and the like impurities leave the dust-separator $c$ through the conduit $g$ and enter into the condenser $h$ which will be more fully described with reference to Fig. 2. Steam and tar are condensed in said condenser $h$ and issue through the pipe $i$ into a vessel $j$, a steam pipe $k$ being provided for volatilizing any ammonia that may have condensed with the steam and tar. The gases leaving the condenser $h$, which are now freed from steam and tar and contain ammonia only, issue through the pipe $l$ and enter the ammonia absorber $m$, where ammonia is absorbed in the cold by passing dilute nitric acid or an acid salt solution or the like through the pipe $n$. The solution, (ammonium nitrate or other ammonium salt) issues from the pipe $o$ and is collected in the tank $p$, whence it can be removed for crystallization. The gas freed from ammonia leaves the absorber $m$ through the pipe $q$ and may be led to be consumed or to a gas holder in the usual manner. $r$ is an air inlet through which air, on its way to the producer blast, is passed with the object of utilizing the heat of the gases, communicated to the cooling water in the condenser $h$. The hot air issues from the condenser through the pipe $s$ and enters the producer blast.

Figure 2:
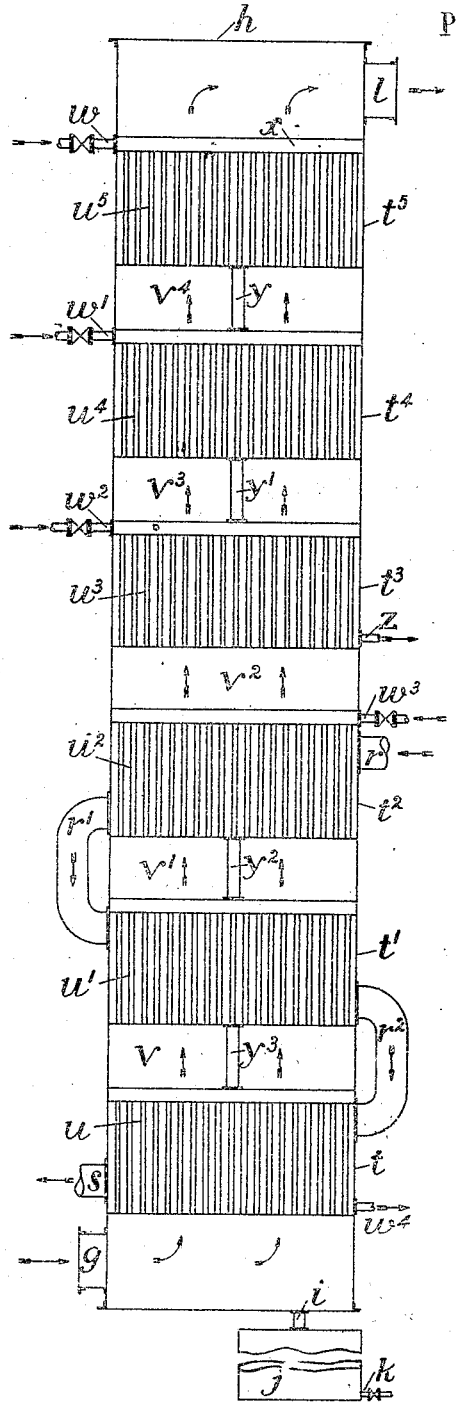
Fig. 2 shows a sectional elevation of the apparatus used for carrying out the process.

Referring now to Fig. 2, the condenser for the steam and tar is shown in said figure as comprising a plurality of superimposed tubular condenser compartments $t$, $t'$, $t^2$, $t^3$, $t^4$, $t^5$. Each compartment consists of a number of vertical condenser tubes $u$ ($u$ to $u^5$) secured in top and bottom tube plates. The gases coming from the dust-separator mentioned with reference to Fig. 1 enter at $g$, and passing through the tubes $u$ of the bottom compartment, enter a space $v$, in which their temperature is equalized. From said space $v$, the gases pass through the second tubular condenser $t'$, from which they issue into the space $v'$ arranged between the second condenser $t'$ and the third condenser $t^2$. The gases continue to ascend through the successive tubes and compartments and finally issue through the pipe $l$.

Cold water is admitted in the opposite direction to the gas, entering the top condenser $t^5$ through the pipe $w$, into the distributing chamber $x$, which uniformly distributes the water and causes it to descend the outer surface of the condenser tubes $u^5$. From the top condenser $t^5$, the water passes through a plurality of vertical pipes arranged centrally of which only one, $y$, is shown, into the distributing chamber of the second tubular condenser $t^4$ and leaves this condenser through a plurality of vertical outlet pipes $y'$ entering the distributing chamber on the top of the third tubular condenser $t^3$, and being finally discharged through the pipe $z$. Additional water inlet pipes $w'$ and $w^2$ to condenser $t^4$ and $t^3$ are provided, the object of these being to regulate the temperature near the top of the condenser.

The lower part of the condenser is similarly arranged, water is admitted to the condenser compartment $t^2$ through the pipe $w^3$ and passes through the outlet pipe $y^2$ into the distributing compartment on the top of the condenser $t'$, leaving said condenser through the outlet pipe $y^3$ and entering the distributing compartment on the top of the condenser $t$, the hot water being finally discharged from the condenser $t$ through the pipe $w^4$.

No additional water inlets have been shown at the three lower condenser compartments, because the temperature is sufficiently controlled by the means provided in the upper portion. The air blast, on its way to the producer, is passed through the tube $r$ into the tubular condenser $t^2$, and this air blast comes into intimate contact with the water film surrounding tubes $u^2$, which results in an efficient heat interchange and saturation of the blast. The air leaves the tubular condenser $t^2$ through the pipe $r'$ and enters the top of the tubular condenser $t'$ where a similar heat interchange is effected. The air leaving the second tubular condenser through the pipe $r^2$, passing into the lowest tubular condenser $t$ and finally issues through the pipe $s$ to the producer blast. As previously stated any ammonia that is condensed with the tar and steam issuing through the pipe $i$ into the tank $j$ may be volatilized again by passing steam through the jet $k$.

Instead of tubular condensers any other kind of condensers may be used.

The heat interchange may also be carried out in an apparatus separate from the condenser.

By our process practically all the ammonia contained in the products leaving the producer, remains in the cooled cleaned gas leaving the condenser. This gas may be passed through centrifugal or other tar separators to remove the last traces of tar, and thence directly into an ammonia absorber and neutralized in the cold with any acid, including the unstable acids, and acid salt solutions.

What we claim as new and desire to secure by Letters Patent of the United States is:—

1. In the recovery of ammonia from producer gas subjecting an ascending current of producer gas prior to the removal of ammonia to temperatures progressively diminishing from not materially below 80° C. to not materially above 40° C. in a manner compelling the condensate to gravitate through the region of highest temperature.

2. In the recovery of ammonia from producer gas passing an ascending current of producer gas prior to the removal of ammonia in a plurality of streams in contact with extraneously cooled surfaces in such way that the gas is subjected to progressively diminishing temperatures from not materially below 80° C. at the gas inlet to not materially above 40° C. at the gas outlet, in a manner compelling the condensate to gravitate through the region of highest temperature.

3. In the recovery of ammonia from producer gas subjecting an ascending current of producer gas prior to the removal of ammonia to temperatures progressively diminishing from not materially below 80° C. to not materially above 40° C. in a manner compelling the condensate to gravitate through the region of highest temperature and thereafter passing the cooled gas in contact with cold, ammonia-absorbing agents.

4. In the recovery of ammonia from producer gas passing an ascending current of producer gas prior to the removal of ammonia in a plurality of streams in contact with extraneously cooled surfaces in such way that the gas is subjected to progressively diminishing temperatures from not materially below 80° C. at the gas inlet to not materially above 40° C. at the gas outlet, in a manner compelling the condensate to gravitate through the region of highest temperature and thereafter passing the cooled gas in contact with cold ammonia-absorbing agents.

In testimony whereof we affix our signatures in presence of two witnesses.

ARTHUR HENRY LYMN.
NIELS EDWARD RAMBUSH.

Witnesses:
R. D'UNGERNSTERNBERG,
DOROTHY MARY ABBOTT.